US012249808B2

(12) United States Patent
Yoshida et al.

(10) Patent No.: US 12,249,808 B2
(45) Date of Patent: Mar. 11, 2025

(54) SPARK PLUG

(71) Applicant: NITERRA CO., LTD., Nagoya (JP)

(72) Inventors: Yuki Yoshida, Nagoya (JP); Naoki Nishio, Nagoya (JP)

(73) Assignee: Niterra Co., Ltd., Nagoya (JP)

( * ) Notice: Subject to any disclaimer, the term of this patent is extended or adjusted under 35 U.S.C. 154(b) by 0 days.

(21) Appl. No.: 18/686,680

(22) PCT Filed: Aug. 29, 2022

(86) PCT No.: PCT/JP2022/032314
§ 371 (c)(1),
(2) Date: Feb. 26, 2024

(87) PCT Pub. No.: WO2023/032874
PCT Pub. Date: Mar. 9, 2023

(65) Prior Publication Data
US 2024/0380189 A1 Nov. 14, 2024

(30) Foreign Application Priority Data
Sep. 2, 2021 (JP) ................................ 2021-143408

(51) Int. Cl.
*H01T 13/06* (2006.01)

(52) U.S. Cl.
CPC ................................... *H01T 13/06* (2013.01)

(58) Field of Classification Search
CPC ..................................................... H01T 13/06
(Continued)

(56) References Cited

U.S. PATENT DOCUMENTS 3,668,749 A * 6/1972 Podiak .................... H01T 13/36 445/7
9,236,716 B2 * 1/2016 Mizutani ................ H01T 13/52
(Continued)

FOREIGN PATENT DOCUMENTS

JP 2006059588 A * 3/2006
JP 2009176525 A * 8/2009
(Continued)

OTHER PUBLICATIONS

International Preliminary Report on Patentability from corresponding International Patent Appl. No. PCT/JP2022/032314, dated Mar. 5, 2024 (with English translation).
(Continued)

*Primary Examiner* — Christopher M Raabe
(74) *Attorney, Agent, or Firm* — Renner, Otto, Boisselle & Sklar, LLP

(57) ABSTRACT

A spark plug which can increase the reactive force of a shelf part. The spark plug includes a cylindrical metal shell provided around an outer periphery of an insulator. The metal shell includes, on an inner periphery of the metal shell, a proximally oriented surface in contact with the insulator, a distally oriented surface located on the distal side relative to the proximally oriented surface, a first surface extending from the distally oriented surface toward the distal side; and a second surface extending from the proximally oriented surface toward the proximal side. In a section containing an axial line, angle A formed between the distally oriented surface and the first surface and angle B formed between the proximally oriented surface and the second surface have a relationship A≤1.15B, with angle A being greater than or equal to 90° and angle B being greater than or equal to 90°.

4 Claims, 3 Drawing Sheets

(58) Field of Classification Search
USPC .......................................................... 313/143
See application file for complete search history.

(56) References Cited

U.S. PATENT DOCUMENTS

| | | | | |
|---|---|---|---|---|
| 9,859,689 | B1 * | 1/2018 | Sadaka | H01T 13/08 |
| 2012/0038263 | A1 * | 2/2012 | Katsuraya | H01T 13/32 313/144 |
| 2013/0147339 | A1 * | 6/2013 | Burrows | H01T 13/20 313/143 |
| 2015/0188293 | A1 * | 7/2015 | Ozeki | H01T 13/36 313/143 |
| 2015/0188294 | A1 * | 7/2015 | Nishida | H01B 3/12 174/110 R |
| 2015/0340842 | A1 * | 11/2015 | Ozeki | H01T 13/36 313/143 |
| 2016/0285240 | A1 * | 9/2016 | Hisada | H01T 13/32 |
| 2019/0312415 | A1 | 10/2019 | Shimada | |
| 2020/0185888 | A1 * | 6/2020 | Niessner | H01T 13/32 |
| 2020/0244049 | A1 * | 7/2020 | Hidaka | H01T 13/58 |

FOREIGN PATENT DOCUMENTS

| | | | |
|---|---|---|---|
| JP | 2014-135189 | A | 7/2014 |
| JP | 2015-018781 | A | 1/2015 |
| JP | 2016-004748 | A | 1/2016 |
| JP | 2019-186014 | A | 10/2019 |
| WO | WO2011/118087 | A1 | 9/2011 |

OTHER PUBLICATIONS

International Search Report from corresponding International Patent Application No. PCT/JP22/32314, dated Oct. 25, 2022.
Notice of Reasons for Refusal (and its English translation) dated Oct. 7, 2022 from related/corresponding Japanese Patent Application No. 2021-143408.

* cited by examiner

[Fig. 1]
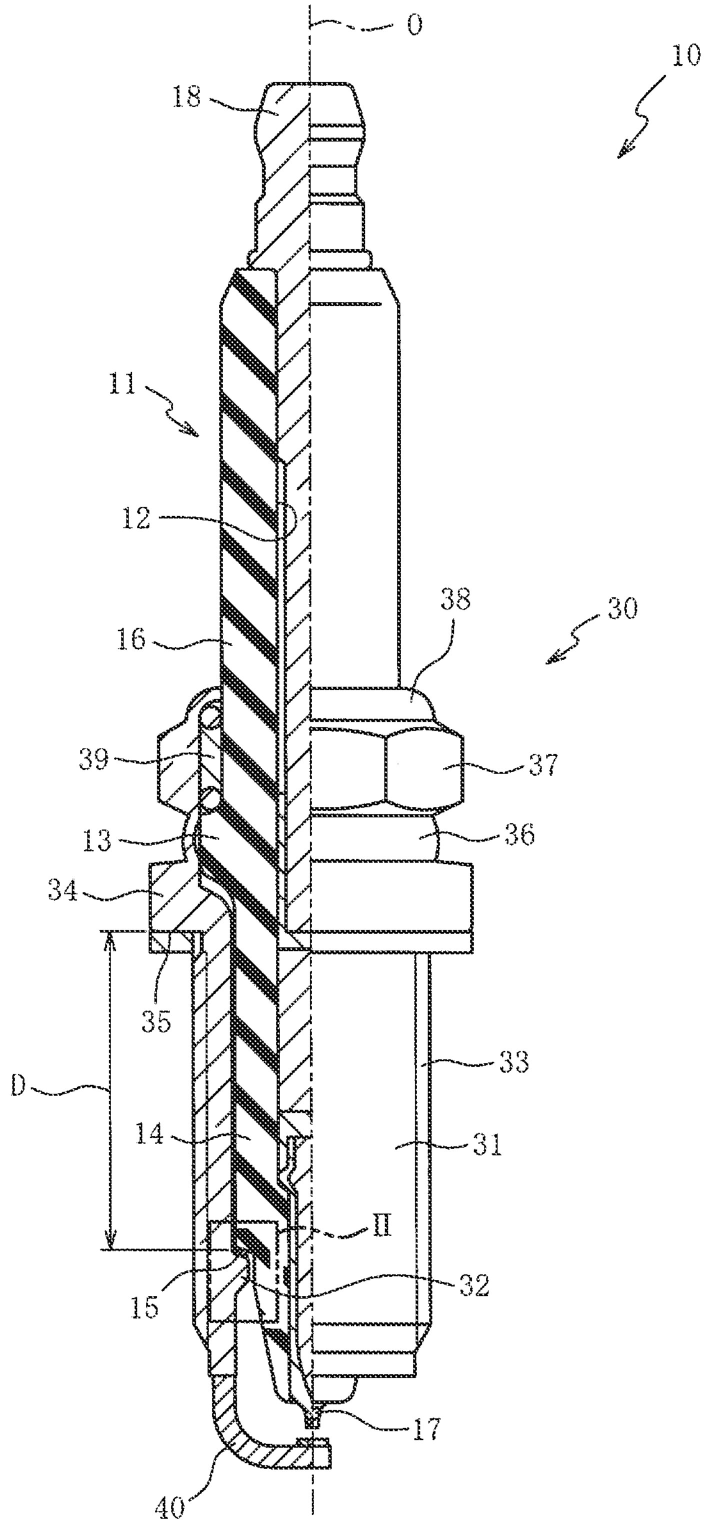

[Fig. 2]
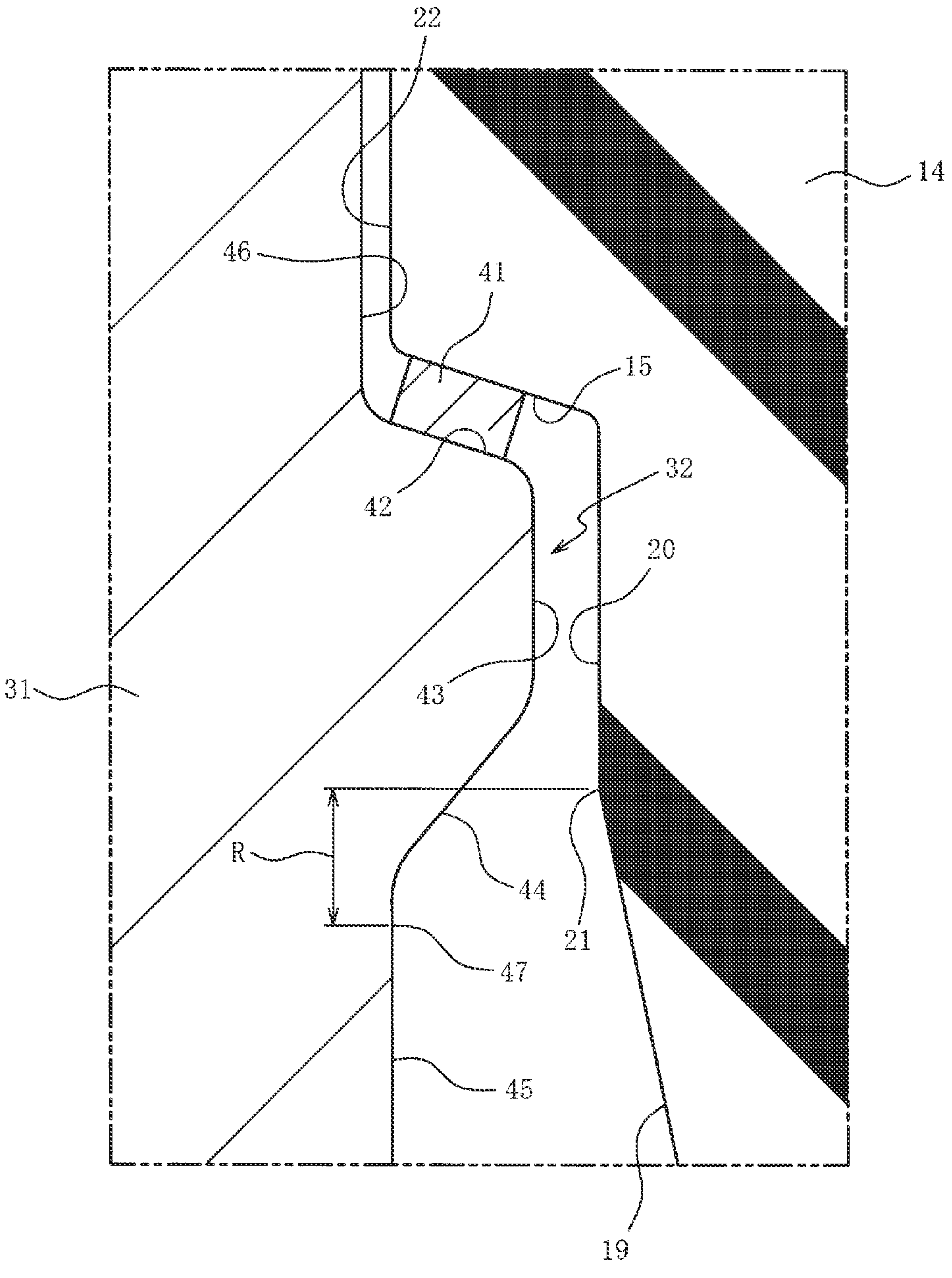

[Fig. 3]
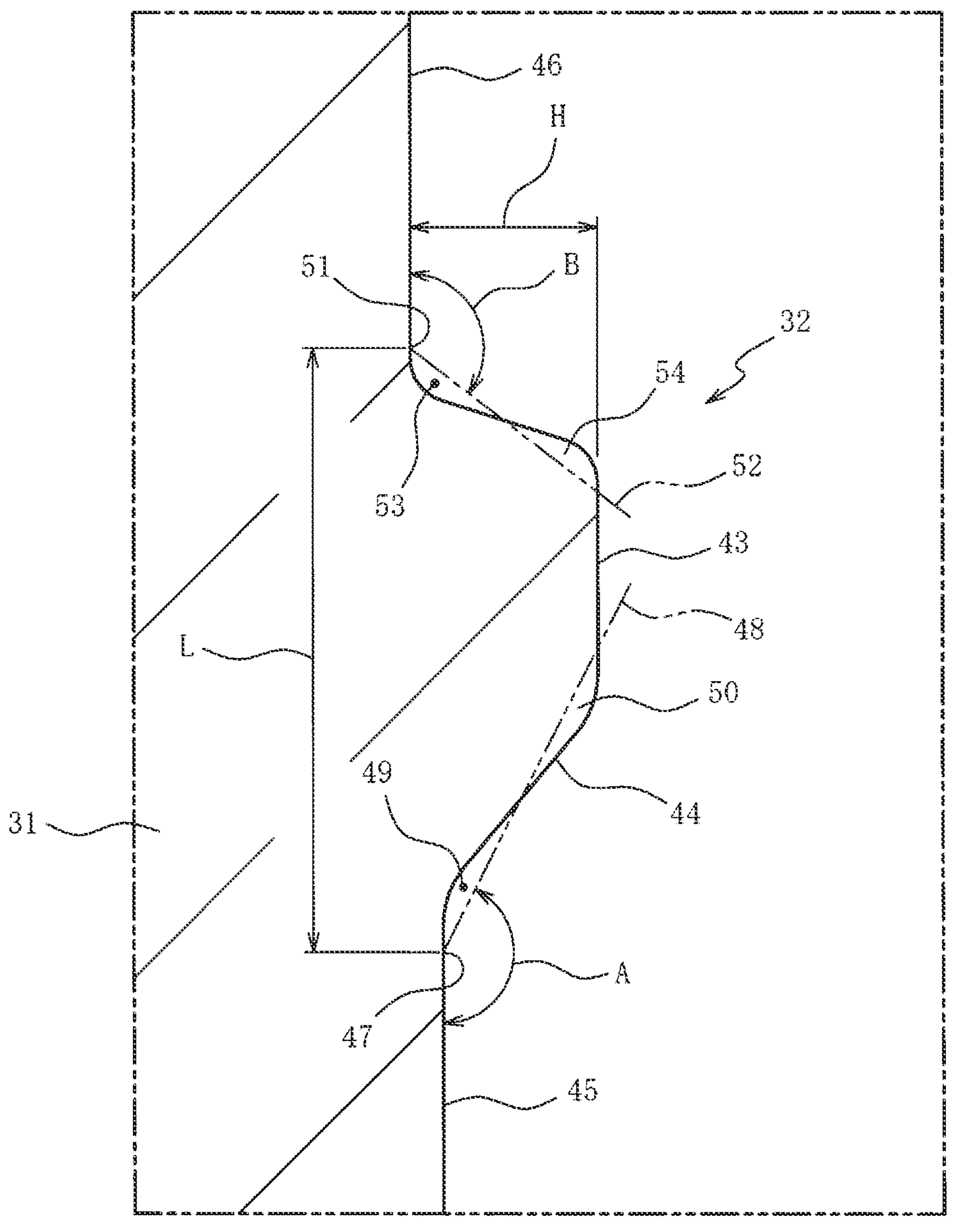

SPARK PLUG

FIELD OF INVENTION

The present invention relates to a spark plug.

BACKGROUND OF INVENTION

Regarding a spark plug including an insulator and a cylindrical metal shell provided around the outer periphery of the insulator, a prior art disclosed in PCT International Patent Application Publication No. WO 2011/118087 ("PTL 1") employs a ledge portion intended to support the insulator and provided on the inner periphery of the metal shell. The insulator is in close contact with the ledge portion directly or with another member in between, whereby the leakage of combustion gas from between the ledge portion and the insulator is reduced.

To further reduce the leakage of combustion gas from between the ledge portion and the insulator, the prior art requires a technique of increasing the reaction force that is exerted by the ledge portion pushing back the insulator.

SUMMARY OF INVENTION

The present invention is to meet the requirement, and an object of the present invention is to provide a spark plug including a ledge portion that exerts an increased reaction force.

Solution to Problem

To achieve the above object, a spark plug according to the present invention includes an insulator extending along an axial line from a distal side toward a proximal side; and a cylindrical metal shell provided around an outer periphery of the insulator. The metal shell includes, on an inner periphery of the metal shell, a ledge portion including a proximally oriented surface and a distally oriented surface, the proximally oriented surface being in contact with the insulator directly or with another member in between, the distally oriented surface being located on the distal side relative to the proximally oriented surface; a first surface extending from the distally oriented surface toward the distal side; and a second surface extending from the proximally oriented surface toward the proximal side. In a section containing the axial line, an angle A formed between the distally oriented surface and the first surface and an angle B formed between the proximally oriented surface and the second surface have a relationship of A≤1.15B, with the angle A being greater than or equal to 90° and the angle B being greater than or equal to 90°.

Advantageous Effects of Invention

According to a first aspect, in the section containing the axial line, the angle A formed between the distally oriented surface of the ledge portion and the first surface of the metal shell and the angle B formed between the proximally oriented surface of the ledge portion and the second surface of the metal shell have a relationship of A≤1.15B, with the angle B being greater than or equal to 90°. The ledge portion has a satisfactory volume, and the force that causes the ledge portion to start undergoing plastic deformation in the axial direction is increased. Therefore, the reaction force with which the ledge portion pushes back the insulator in the axial direction is increased. Furthermore, since the angle A is greater than or equal to 90°, the electric field to be generated at the distal end of the distally oriented surface is weaker than in a case where the angle A is smaller than 90°. Thus, the occurrence of unintended discharge (so-called flashover) at the distal end of the distally oriented surface is reduced.

According to a second aspect, in the first aspect, the trunk portion including the ledge portion includes an external thread on the outer periphery thereof. As the nominal diameter of the external thread decreases; that is, as the outer diameter of the trunk portion decreases, the thickness of the trunk portion decreases, which reduces the force that causes the ledge portion to start undergoing plastic deformation. In such a case, the reaction force that is exerted by the ledge portion tends to be reduced. The reduction in the reaction force that is exerted by the ledge portion tends to be suppressed in the first aspect. Such a tendency is particularly pronounced if the external thread has a nominal diameter of 12 mm or smaller.

According to a third aspect, in the first or second aspect, a third surface of the insulator faces the first surface of the metal shell from the radially inner side, and a fourth surface of the insulator is continuous with the proximal end of the third surface. The boundary between the distally oriented surface and the first surface of the metal shell is defined at a position within a range of 1 mm inclusive in the direction of the axial line relative to the boundary between the third surface and the fourth surface of the insulator. Since the space between the metal shell and the insulator where combustion gas tends to stagnate is reduced, the amount of adhesion of carbon, contained in the combustion gas, to the insulator is reduced. Thus, the occurrence of unintended discharge (flashover) due to any carbon adhered to the insulator is reduced.

According to a fourth aspect, in any of the first to third aspects, the trunk portion including the ledge portion includes an external thread on the outer periphery thereof. A flange portion projects relative to the outer periphery of the external thread and includes a seating portion adjoining the proximal end of the trunk portion. As the distance in the axial direction from the boundary between the second surface and the proximally oriented surface of the metal shell to the seating portion increases, the amount of thermal expansion of the metal shell increases. Accordingly, when the temperature of the metal shell rises, the force applied from the insulator to the ledge portion is reduced. Consequently, the reaction force that is exerted by the ledge portion tends to be reduced. The reduction in the reaction force that is exerted by the ledge portion tends to be suppressed in the first aspect. Such a tendency is particularly pronounced if the distance is 24 mm or greater.

BRIEF DESCRIPTION OF DRAWINGS

FIG. 1 illustrates a spark plug according to an embodiment with one side thereof being illustrated in sectional view.

FIG. 2 illustrates an enlarged section of the spark plug, illustrating part II defined in FIG. 1.

FIG. 3 illustrates a part of a section of a metal shell.

DETAILED DESCRIPTION OF INVENTION

A preferred embodiment of the present invention will now be described with reference to the accompanying drawings. FIG. 1 illustrates a spark plug 10 according to an embodiment with one side thereof, relative to an axial line O, being illustrated in sectional view. In FIG. 1, the lower side of the page is referred to as the distal side of the spark plug 10, and the upper side of the page is referred to as the proximal side of the spark plug 10 (this also applies to FIGS. 2 and 3). As illustrated in FIG. 1, the spark plug 10 includes an insulator 11 and a metal shell 30.

The insulator 11 is a substantially circular cylindrical member made of alumina or the like that is excellent in insulation and mechanical characteristics under high temperature. The insulator 11 has an axial hole 12, which extends along the axial line O. The insulator 11 includes a projecting portion 13, which projects radially outward in a central part in the axial direction; a first portion 14, which adjoins the distal side of the projecting portion 13; and a second portion 16, which adjoins the proximal side of the projecting portion 13. The projecting portion 13 is continuous over the entire periphery of the insulator 11.

The first portion 14 has on the outer periphery thereof a distally oriented surface 15. In the present embodiment, the distally oriented surface 15 is a circular conical surface that is continuous over the entire periphery of the first portion 14. The distally oriented surface 15 may alternatively be a surface that is perpendicular to the axial line O and is continuous over the entire periphery of the first portion 14.

On the distal side of the axial hole 12 of the insulator 11 is provided a center electrode 17. The center electrode 17 is a bar-type electrode and is held by the insulator 11. The center electrode 17 includes a core material having excellent thermal conductivity. The core material is embedded in a parent material. The parent material is made of a metallic material composed of a Ni-based alloy or Ni. The core material is made of copper or a copper-based alloy. The core material may be omitted.

The center electrode 17 is electrically connected to a metal terminal 18 in the axial hole 12 of the insulator 11. The metal terminal 18 is a bar-type member to which a high-voltage cable (not illustrated) is to be connected. The metal terminal 18 is made of an electrically conductive metallic material (such as low-carbon steel or the like)

The metal shell 30 is a substantially circular cylindrical member made of an electrically conductive metallic material (such as a low-carbon steel or the like). The metal shell 30 includes, in order from the distal side toward the proximal side, a trunk portion 31, a flange portion 34, a bent portion 36, a tool engagement portion 37, and a crimping portion 38, all of which are continuous with one another.

The trunk portion 31 includes a ledge portion 32 on the inner periphery thereof and an external thread 33 on the outer periphery thereof. The ledge portion 32 is located on the distal side relative to the distally oriented surface 15 of the insulator 11. The spark plug 10 is to be fitted at the external thread 33 thereof to a plug hole provided in an engine (not illustrated). The external thread 33 has a nominal diameter of, for example, 6 to 12 mm.

The flange portion 34, which adjoins the proximal end of the trunk portion 31, includes a seating portion 35. The outer diameter of the flange portion 34 is greater than the outer diameter of the external thread 33. The seating portion 35 is an annular surface oriented toward the distal side. When the external thread 33 is fastened into a thread provided in the plug hole, an axial tension is generated in the external thread 33 with the aid of the seating portion 35. In the present embodiment, the seating portion 35 is a surface perpendicular to the axial line O. The seating portion 35 may alternatively be a circular conical surface (of a so-called tapered-seat type) whose diameter decreases toward the distal side in conformity with the shape of the plug hole.

The bent portion 36 connects the flange portion 34 and the tool engagement portion 37 to each other. The bent portion 36 is in a bent state and thus exerts an elastic force, which acts as a force exerted in such a direction as to move the flange portion 34 and the tool engagement portion 37 away from each other in the axial direction. The tool engagement portion 37 is a portion where a tool such as a wrench engages when the external thread 33 is screwed into the thread provided in the plug hole. The crimping portion 38 is an annular portion that is bent radially inward. The crimping portion 38 is located on the proximal side relative to the projecting portion 13 of the insulator 11. Between the projecting portion 13 of the insulator 11 and the crimping portion 38 is provided a seal portion 39. The seal portion 39 is a filling made of powder of talc or the like. The seal portion 39 extends over the entire periphery of the second portion 16 of the insulator 11.

A ground electrode 40 is a bar-type member made of metal (such as a nickel-based alloy) and is connected to the trunk portion 31 of the metal shell 30. Between the ground electrode 40 and the center electrode 17 is provided a spark gap.

FIG. 2 illustrates an enlarged section, containing the axial line O, of the spark plug 10, illustrating part II defined in FIG. 1. The ledge portion 32 included in the trunk portion 31 includes a proximally oriented surface 42; a connecting surface 43, which adjoins the distal side of the proximally oriented surface 42; and a distally oriented surface 44, which adjoins the distal side of the connecting surface 43 and is located on the distal side relative to the proximally oriented surface 42. In the present embodiment, the proximally oriented surface 42 is a circular conical surface that is continuous over the entire periphery of the trunk portion 31. The proximally oriented surface 42 may alternatively be a surface that is perpendicular to the axial line O and is continuous over the entire periphery of the trunk portion 31.

The connecting surface 43 is a circular cylindrical surface that is continuous over the entire periphery of the trunk portion 31. Alternatively, the connecting surface 43 may be a circular conical surface that is continuous over the entire periphery of the trunk portion 31 or may be a spherical strip that is continuous over the entire periphery of the trunk portion 31. If the connecting surface 43 is a circular conical surface, the circular conical surface may have an inner diameter that decreases toward the distal side, or may have an inner diameter that increases toward the distal side.

The distally oriented surface 44 is a circular conical surface that is continuous over the entire periphery of the trunk portion 31. The distally oriented surface 44 may alternatively be a surface that is perpendicular to the axial line O and is continuous over the entire periphery of the trunk portion 31. In the present embodiment, the proximally oriented surface 42 and the connecting surface 43 meet each other forming a round corner (a round surface). The round corner may alternatively be a chamfered corner (an angled surface). Likewise, the distally oriented surface 44 and the connecting surface 43 meet each other forming a round corner (a round surface). The round corner may alternatively be a chamfered corner (an angled surface). The rounding or chamfering at the corner where the proximally oriented surface 42 and the connecting surface 43 meet may be omitted. The rounding or chamfering at the corner where the distally oriented surface 44 and the connecting surface 43 meet may be omitted.

The trunk portion 31 includes a first surface 45, which extends from the distally oriented surface 44 toward the distal side; and a second surface 46, which extends from the proximally oriented surface 42 toward the proximal side. The first surface 45 is a circular cylindrical surface that is continuous over the entire periphery of the trunk portion 31. The first surface 45 may alternatively be a circular conical surface that is continuous over the entire periphery of the trunk portion 31. If the first surface 45 is a circular conical surface, the circular conical surface may have an inner diameter that decreases toward the distal side, or may have an inner diameter that increases toward the distal side. The second surface 46 is a circular cylindrical surface that is continuous over the entire periphery of the trunk portion 31. The second surface 46 may alternatively be a circular conical surface that is continuous over the entire periphery of the trunk portion 31. If the second surface 46 is a circular conical surface, the circular conical surface may preferably have an inner diameter that decreases toward the distal side.

Between the distally oriented surface 15 of the first portion 14 and the proximally oriented surface 42 of the metal shell 30 is provided a packing 41. The packing 41 is an annular plate. The packing 41 is made of a metal, such as iron or steel, softer than the metallic material forming the metal shell 30.

The first portion 14 includes a third surface 19, which faces the first surface 45 of the trunk portion 31 from the radially inner side; and a fourth surface 20, which is continuous with the proximal end of the third surface 19. The fourth surface 20 adjoins the distal side of the distally oriented surface 15. The proximal side of the distally oriented surface 15 adjoins a fifth surface 22. The fifth surface 22 is a circular cylindrical surface that is continuous over the entire periphery of the first portion 14. The fifth surface 22 may alternatively be a circular conical surface that is continuous over the entire periphery of the first portion 14. If the fifth surface 22 is a circular conical surface, the outer diameter of the fifth surface 22 may preferably increase toward the proximal side.

The third surface 19 is a circular conical surface that is continuous over the entire periphery of the first portion 14. The outer diameter of the third surface 19 decreases toward the distal side. The fourth surface 20 is a circular cylindrical surface that is continuous over the entire periphery of the first portion 14. The fourth surface 20 may alternatively be a circular conical surface that is continuous over the entire periphery of the first portion 14. If the fourth surface 20 is a circular conical surface, the outer diameter of the fourth surface 20 decreases toward the distal side. Therefore, in FIG. 2, the inclination of the third surface 19 relative to the axial line O (see FIG. 1) is different from the inclination of the fourth surface 20 relative to the axial line O. Accordingly, a boundary 21 (a corner) appears between the third surface 19 and the fourth surface 20. If the corner is rounded or chamfered, the position of the boundary 21 is regarded as the intersection point between a line representing the third surface 19 excluding the round or chamfered part and a line representing the fourth surface 20 excluding the round or chamfered part.

The spark plug 10 is manufactured through the following method, for example. First, the center electrode 17 is inserted into the axial hole 12 of the insulator 11 and is positioned such that the distal end of the center electrode 17 is exposed to the outside from the insulator 11. Subsequently, the metal terminal 18 is inserted into the axial hole 12 of the insulator 11 and is electrically connected to the center electrode 17. Subsequently, the packing 41 is placed on the proximally oriented surface 42 of the ledge portion 32 of the metal shell 30, and the insulator 11 is then inserted into the metal shell 30, whereby the packing 41 is nipped between the distally oriented surface 15 of the insulator 11 and the proximally oriented surface 42 of the metal shell 30.

Subsequently, the seal portion 39 is provided between the second portion 16 of the insulator 11 and the metal shell 30. Then, the crimping portion 38 and the bent portion 36 are formed. Accordingly, a part of the metal shell 30 that extends from the ledge portion 32 to the crimping portion 38 applies, through the packing 41 and the seal portion 39, a compressing load acting in the axial direction to a part of the insulator 11 that extends from the distally oriented surface 15 to the projecting portion 13. Hence, the insulator 11 is held to the metal shell 30. Subsequently, the ground electrode 40 is bent. Thus, the spark plug 10 is obtained.

FIG. 3 illustrates a part of a section, containing the axial line O, of the metal shell 30. FIG. 3 is a diagram obtained from FIG. 2 by removing the insulator 11 and the packing 41. In the section of the ledge portion 32 that contains the axial line O, an angle A (°), which is formed between the distally oriented surface 44 and the first surface 45, and an angle B (°), which is formed between the proximally oriented surface 42 and the second surface 46, have a relationship of $A \leq 1.15B$. The angle A is greater than or equal to 90°. The angle B is greater than or equal to 90°.

A first line 48 is a line defined such that an area 49, which is enclosed by the first line 48 and the inner periphery of the trunk portion 31, becomes equal to an area 50, which is the area of a part of the ledge portion 32 that is cut by the first line 48. The angle A is an angle formed between the first line 48 and the first surface 45. Between the distally oriented surface 44 and the first surface 45 is defined a boundary 47, which is the intersection point between the inner periphery of the trunk portion 31 and the first line 48.

A second line 52 is a line defined such that an area 53, which is enclosed by the second line 52 and the inner periphery of the trunk portion 31, becomes equal to an area 54, which is the area of a part of the ledge portion 32 that is cut by the second line 52. The angle B is an angle formed between the second line 52 and the second surface 46. Between the proximally oriented surface 42 and the second surface 46 is defined a boundary 51, which is the intersection point between the inner periphery of the trunk portion 31 and the second line 52.

If $A \leq 1.15B$ is satisfied, the ledge portion 32 has a satisfactory volume, with the position of the boundary 47 in the axial direction being fixed. The force that causes the ledge portion 32 to start undergoing plastic deformation in the axial direction by being pushed in the axial direction by the distally oriented surface 15 of the insulator 11 is increased. Therefore, the reaction force that is exerted by the ledge portion 32 in the axial direction is increased. Thus, the leakage of combustion gas from between the proximally oriented surface 42 of the trunk portion 31 and the distally oriented surface 15 of the first portion 14 is reduced. Consequently, the probability of breakage of the insulator 11 that may occur if the insulator 11 is instantaneously heated by any leaked combustion gas is reduced.

Since the angle B is greater than or equal to 90°, no pointed part is formed near the proximally oriented surface 42 of the ledge portion 32. Such a pointed part, if any, of the ledge portion 32 is pushed by the distally oriented surface 15 of the insulator 11, and the load concentrates on the pointed part. In such a case, the pointed part tends to undergo plastic deformation. If the ledge portion 32 has no pointed part, the occurrence of such plastic deformation near the proximally oriented surface 42 of the ledge portion 32 is reduced. Therefore, the reaction force that is exerted by the ledge portion 32 in the axial direction is increased.

Since the angle A is greater than or equal to 90°, the electric field that is generated at the distal end of the distally oriented surface 44 (at the corner where the distally oriented surface 44 meets the connecting surface 43) is weaker than in a case where the angle A is smaller than 90°. Thus, the occurrence of unintended discharge (so-called flashover) at the distal end of the distally oriented surface 44 is reduced.

If A>1.15B, the reduction in the volume of the ledge portion 32 is avoidable by changing the position of the boundary 47 in the axial direction toward the distal side. In that case, the volume of the space between the distally oriented surface 44 and the first portion 14 is reduced in correspondence with the amount of change in the position of the boundary 47 in the axial direction toward the distal side. Since the probability that the combustion gas may stagnate in the space between the distally oriented surface 44 and the first portion 14 is increased, the amount of adhesion of carbon, contained in the combustion gas, to the outer periphery of the first portion 14 may increase. That is, if the position of the boundary 47 in the axial direction is changed toward the distal side to establish A>1.15B, the occurrence of unintended discharge (flashover) due to any carbon adhered to the outer periphery of the first portion 14 may increase. Hence, the ledge portion 32 may preferably satisfy the condition of A≤1.15B.

To make the ledge portion 32 exert a satisfactory level of reaction force, the ledge portion 32 needs to have a certain size. The distance, L, in the axial direction between the boundary 47 and the boundary 51 of the ledge portion 32 may preferably be 1 to 7 mm. The length, H, of the proximally oriented surface 42 in the radial direction (the height from the second surface 46 to the connecting surface 43) may preferably be 0.1 to 2.5 mm.

The boundary 47 between the distally oriented surface 44 of the ledge portion 32 and the first surface 45 of the trunk portion 31 may preferably be defined at a position within a range, R, of 1 mm inclusive in the axial direction relative to the boundary 21 between the third surface 19 and the fourth surface 20 of the first portion 14 (see FIG. 2). In the present embodiment, the boundary 47 is defined at a position on the distal side relative to the boundary 21 and within 1 mm inclusive from the boundary 21. Such a design avoids the narrowing of the space between the third surface 19 of the first portion and the ledge portion 32. Note that the boundary 47 may alternatively be defined at a position on the proximal side relative to the boundary 21 and within 1 mm inclusive from the boundary 21. Such a design avoids the widening of the space between the fourth surface 20 of the first portion and the trunk portion 31.

If the space between the third surface 19 of the first portion and the ledge portion 32 is narrowed or if the space between the fourth surface 20 of the first portion and the trunk portion 31 is widened, the combustion gas tends to stagnate in that space. In view of reducing the stagnation of the combustion gas, if the boundary 47 is defined at a position on the distal side in the axial direction relative to the boundary 21 and within 1 mm inclusive from the boundary 21, the space between the trunk portion 31 and the first portion 14 where the combustion gas tends to stagnate is reduced. Since the combustion gas becomes less likely to stagnate in the space between the trunk portion 31 and the first portion 14, the amount of adhesion of carbon, contained in the combustion gas, to the first portion 14 is reduced. Thus, the occurrence of unintended discharge (flashover) due to any carbon adhered to the first portion 14 is reduced.

As the distance, D, in the axial direction from the boundary 51 (see FIG. 3) between the second surface 46 and the proximally oriented surface 42 of the trunk portion 31 to the seating portion 35 (see FIG. 1) increases, the amount of thermal expansion of the trunk portion 31 increases. When the engine (not illustrated) to which the spark plug 10 is attached is activated, the temperature of the metal shell 30 rises, causing the trunk portion 31 to undergo thermal expansion. The thermal expansion increases the distance between the distally oriented surface 15 of the insulator 11 and the proximally oriented surface 42 of the metal shell 30. Accordingly, the force applied from the insulator 11 to the ledge portion 32 is reduced. Consequently, the reaction force that is exerted by the ledge portion 32 tends to be reduced. The relationship of A≤1.15B tends to suppress the above reduction in the reaction force that is exerted by the ledge portion 32. Such a tendency is particularly pronounced if the distance D is 24 mm or greater. The distance D is, for example, 24 to 40 mm.

As the nominal diameter of the external thread 33 (see FIG. 1) decreases; that is, as the outer diameter of the trunk portion 31 decreases, the thickness of the trunk portion 31 decreases, which reduces the force that causes the ledge portion 32 to start undergoing plastic deformation. In such a case, the reaction force that is exerted by the ledge portion 32 tends to be reduced. The relationship of A≤1.15B tends to suppress the above reduction in the reaction force that is exerted by the ledge portion 32. Such a tendency is particularly pronounced if the external thread 33 has a nominal diameter of 12 mm or smaller.

Examples

The present invention will further be described in detail by taking some examples. Note that the present invention is not limited to the following examples.

(Test 1)

The tester made samples of the spark plug 10 according to the embodiment and conducted a test of examining the influence brought on airtightness by the relationship between the angle A and the angle B at the ledge portion 32 of the metal shell 30 and the nominal diameter of the external thread 33. The tester prepared metal shells 30 with the nominal diameter of the external thread 33 varied among 10 mm, 12 mm, and 14 mm and with the ratio A/B between the angle A and the angle B at the ledge portion 32 varied among 1.15, 1.20 and 1.25; and three kinds of insulators 11 with the outer diameter of the first portion 14 varied. The distance L in the axial direction between the boundary 47 and the boundary 51 of the ledge portion 32 was set to 2.2 mm. The length H of the proximally oriented surface 42 in the radial direction was set to 0.6 mm. The distance D in the axial direction between the boundary 51 of the ledge portion 32 and the seating portion 35 was set to 17 mm. The angle B (B≥90°) at the ledge portion 32 was made constant. The value of A/B was varied by varying the size of the angle A.

The packing 41 was placed on the proximally oriented surface 42 of each of the metal shells 30, and a corresponding one of the insulators 11 was inserted into the metal shell 30, whereby the packing 41 was positioned between the distally oriented surface 15 of the insulator 11 and the proximally oriented surface 42 of the metal shell 30. After the seal portion 39 was provided between the second portion 16 of each of the insulators 11 and a corresponding one of the metal shells 30, a force of a certain level was applied in the axial direction to the projecting portion 13 of the insulator 11 through the seal portion 39 by forming the crimping portion 38. Thus, different samples were obtained.

After each of the samples was kept in an atmosphere at 150° C. for 30 minutes, a pneumatic pressure of 1.8 MPa was applied in that atmosphere to the gap between the trunk portion 31 of the metal shell 30 and the first portion 14 of the insulator 11. Thus, an airtightness test was conducted in which the amount of air leakage from between the crimping portion 38 and the insulator 11 was measured. Those samples that marked an amount of air leakage of 1 mL or smaller per minute were rated as Y. Those samples that marked an amount of air leakage of over 1 mL per minute were rated as N. The results are summarized in Table 1.

TABLE 1

| | | A/B | | |
|---|---|---|---|---|
| | | 1.15 | 1.20 | 1.25 |
| Nominal Diameter (mm) | 14 | Y | Y | Y |
| | 12 | Y | N | N |
| | 10 | Y | N | N |

According to Table 1, for A/B=1.15, all of the samples with the nominal diameter of the external thread 33 being 10 mm, 12 mm, and 14 mm were rated as Y. For A/B=1.20 and A/B=1.25, those samples with the nominal diameter of the external thread 33 being 14 mm were rated as Y, whereas those samples with the nominal diameter of the external thread 33 being 10 mm and 12 mm were rated as N.

The samples with the nominal diameter of the external thread 33 being 10 mm and 12 mm were found to exhibit high airtightness for A/B=1.15 than for A/B>1.15. It is considered that the high airtightness was achieved because the reaction force exerted by the ledge portion pushing back the insulator 11 in the axial direction was greater for A/B=1.15 than for A/B>1.15. If A/B<1.15, the volume of the ledge portion 32 is greater than when A/B=1.15. Therefore, the reaction force that is exerted by the ledge portion 32 is much greater. Hence, it is obvious that a satisfactory airtightness is achieved when A/B≤1.15. It has also been found that the effect of increasing the airtightness is increased if the external thread 33 has a nominal diameter of 12 mm or smaller.

(Test 2)

The tester made samples of the spark plug 10 according to the embodiment and conducted a test of examining the influence brought on airtightness by the relationship between the angle A and the angle B at the ledge portion 32 of the metal shell 30 and the distance D between the boundary 51 of the ledge portion 32 and the seating portion 35. The tester prepared metal shells 30 with the distance D varied among 17 mm, 19 mm, 22 mm, 24 mm, and 26 mm and with the ratio A/B between the angle A and the angle B at the ledge portion 32 varied among 1.15, 1.20, and 1.25; and five kinds of insulators 11 with the distance between the distally oriented surface 15 and the flange portion 34 varied. The distance L in the axial direction between the boundary 47 and the boundary 51 of the ledge portion 32 was set to 2.2 mm. The length H of the proximally oriented surface 42 in the radial direction was set to 0.6 mm. The nominal diameter of the external thread 33 was set to 14 mm. The angle B (B≥90°) at the ledge portion 32 was made constant. The value of A/B was varied by varying the size of the angle A.

Different samples were obtained in the same manner as for Test 1, and the same airtightness test as for Test 1 was conducted. Those samples that marked an amount of air leakage of 1 mL or smaller per minute were rated as Y. Those samples that marked an amount of air leakage of over 1 mL per minute were rated as N. The results are summarized in Table 2.

TABLE 2

| | | A/B | | |
|---|---|---|---|---|
| | | 1.15 | 1.20 | 1.25 |
| Distance D (mm) | 17 | Y | Y | Y |
| | 19 | Y | Y | N |
| | 22 | Y | Y | N |
| | 24 | Y | N | N |
| | 26 | Y | N | N |

According to Table 2, for A/B=1.15, all of the samples with the distance D being 17 to 26 mm were rated as Y. For A/B=1.20, those samples with the distance D being 17 to 22 mm were rated as Y, whereas those samples with the distance D being 24 to 26 mm were rated as N. For A/B=1.25, those samples with the distance D being 17 mm were rated as Y, whereas those samples with the distance D being 19 to 26 mm were rated as N.

The samples with the distance D being 24 mm and 26 mm were found to exhibit high airtightness for A/B=1.15 than for A/B>1.15. It is considered that the high airtightness was achieved because the reaction force exerted by the ledge portion pushing back the insulator 11 in the axial direction was greater for A/B=1.15 than for A/B>1.15. If A/B<1.15, the volume of the ledge portion 32 is greater than when A/B=1.15. Therefore, the reaction force that is exerted by the ledge portion 32 is much greater. Hence, it is obvious that a satisfactory airtightness is achieved when A/B≤1.15. It has also been found that the effect of increasing the airtightness is increased when the distance D is 24 mm or greater.

While the present invention has been described above on the basis of an embodiment thereof, the present invention is not limited to the above embodiment in any way. It is easily understood that various improvements and modifications can be made within the scope of the present invention.

While the above embodiment relates to a case where the crimping portion 38 of the metal shell 30 applies a force in the axial direction to the projecting portion 13 of the insulator 11 through the seal portion 39, the present invention is not necessarily limited to such an embodiment. The same advantageous effects as in the above embodiment are also produced in a case where the crimping portion 38 of the metal shell 30 applies a force in the axial direction to the projecting portion 13 of the insulator 11 with no seal portion 39.

While the above embodiment relates to a case where the spark plug 10 utilizes arc discharge, the present invention is not necessarily limited to such an embodiment. The present invention is naturally applicable to a spark plug of another kind. Examples of the spark plug of another kind include spark plugs utilizing corona discharge or dielectric-barrier discharge.

While the above embodiment relates to a case where the proximally oriented surface 42 of the metal shell 30 is in contact with the distally oriented surface 15 of the insulator 11 with the packing 41 in between, the present invention is not necessarily limited to such an embodiment. It is naturally possible to omit the packing 41, establishing a configuration in which the proximally oriented surface 42 of the metal shell 30 is directly in contact with the distally oriented surface 15 of the insulator 11.

DESCRIPTION OF REFERENCE NUMERALS

10 spark plug
11 insulator
19 third surface
20 fourth surface
21 boundary between third surface and fourth surface
30 metal shell
31 trunk portion
32 ledge portion
33 external thread
34 flange portion
35 seating portion
41 packing
42 proximally oriented surface
44 distally oriented surface
45 first surface
46 second surface
47 boundary between the distally oriented surface and first surface
51 boundary between second surface and proximally oriented surface
O axial line

What is claimed is:

1. A spark plug comprising:

an insulator extending along an axial line from a distal side toward a proximal side; and a cylindrical metal shell provided around an outer periphery of the insulator, wherein the metal shell includes, on an inner periphery of the metal shell, a ledge portion including a proximally oriented surface and a distally oriented surface, the proximally oriented surface being in contact with the insulator directly or with another member in between, the distally oriented surface being located on the distal side relative to the proximally oriented surface;

a first surface extending from the distally oriented surface toward the distal side; and a second surface extending from the proximally oriented surface toward the proximal side, wherein, in a section containing the axial line, an angle A formed between the distally oriented surface and the first surface and an angle B formed between the proximally oriented surface and the second surface have a relationship of $A \leq 1.15B$, with the angle A being greater than or equal to 90° and the angle B being greater than or equal to 90°, and wherein the insulator includes a third surface that faces the first surface from a radially inner side.

2. The spark plug according to claim 1, wherein the metal shell includes a trunk portion on an inner periphery of which the ledge portion is provided and on an outer periphery of which an external thread is provided, and wherein the external thread has a nominal diameter of 12 mm or smaller.

3. The spark plug according to claim 1, wherein the insulator further includes a fourth surface that is continuous with a proximal end of the third surface, and wherein a boundary between the distally oriented surface and the first surface is defined at a position within a range of 1 mm inclusive in a direction of the axial line relative to a boundary between the third surface and the fourth surface.

4. The spark plug according to claim 1, wherein the metal shell includes a trunk portion on an inner periphery of which the ledge portion is provided and on an outer periphery of which an external thread is provided; and a flange portion including a seating portion, the seating portion adjoining a proximal end of the trunk portion, the flange portion projecting relative to an outer periphery of the external thread, and wherein a distance in a direction of the axial line from a boundary between the second surface and the proximally oriented surface to the seating portion is 24 mm or greater.

* * * * *